United States Patent [19]
Steltz

[11] 3,788,501
[45] Jan. 29, 1974

[54] ADJUSTABLE MOUNTING FOR REFUSE DUMP TRUCK PACKER PLATE

[75] Inventor: Douglas C. Steltz, Waukesha, Wis.

[73] Assignee: Portec, Inc., Oak Brook, Ill.

[22] Filed: Oct. 28, 1971

[21] Appl. No.: 193,334

[52] U.S. Cl............................. 214/83.3, 100/233
[51] Int. Cl............................................. B65f 3/00
[58] Field of Search... 214/83.3, 148; 100/226, 233, 100/257; 308/58, 59, 60

[56] References Cited
UNITED STATES PATENTS

| 3,447,700 | 6/1969 | Nickel | 214/83.3 X |
| 2,111,341 | 3/1938 | Tetrault | 214/148 X |
| 277,157 | 5/1883 | Pearce | 308/59 |
| 2,541,080 | 2/1951 | Lyon | 308/59 X |
| 1,778,231 | 10/1930 | Sjolander | 308/59 |

Primary Examiner—Albert J. Makay
Attorney, Agent, or Firm—Emory L. Groff; Emory L. Groff, Jr.

[57] ABSTRACT

The packer door or plate of a refuse collection and dump truck is supported for swinging movement on a pair of pillow blocks which are mounted adjustably on side ledges of the truck body. The pillow blocks are adjusted and locked in position to provide a precise clearance between the packer plate and the rear mouth of the dump body.

7 Claims, 5 Drawing Figures

PATENTED JAN 29 1974 3,788,501
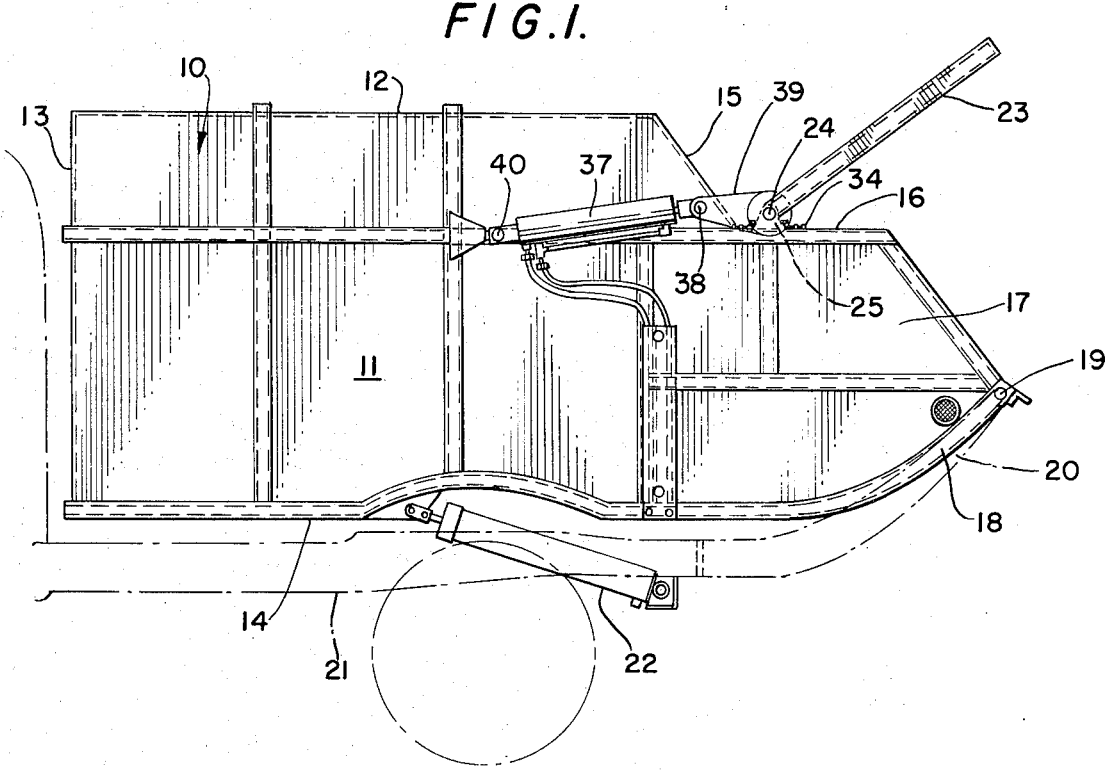
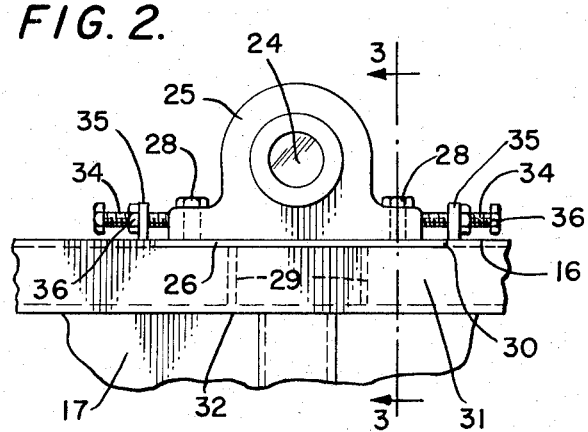
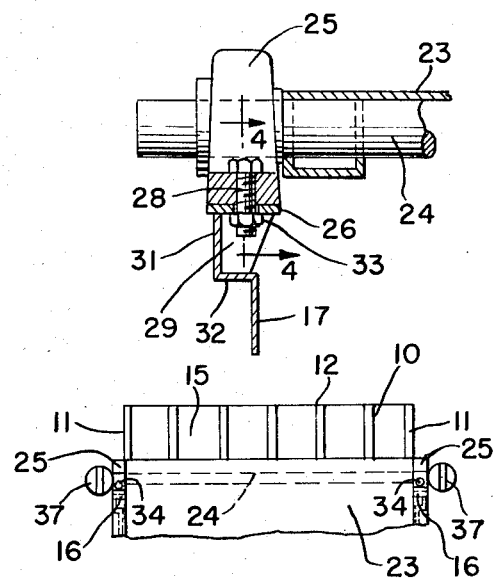
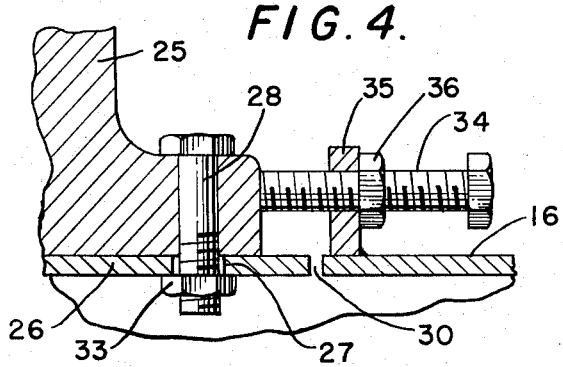
INVENTOR
DOUGLAS C. STELTZ
BY Emory L. Groff Jr.
ATTORNEY

ADJUSTABLE MOUNTING FOR REFUSE DUMP TRUCK PACKER PLATE

An object of the invention is to improve upon the construction and operation of refuse trucks of the type disclosed in prior U.S. Pat. No. 3,554,398 to Nickel. In such prior art trucks, refuse is introduced through a rearward mouth or opening in the truck body and a pivoted door or packer plate is operated by power means to periodically compress or pack the refuse in the truck body to insure the accommodation of a maximum load. The packer plate also forms a closure for the rear open end of the truck body and is elevated to allow dumping of the contents into a mother truck or receptacle.

The refuse truck body is customarily made from heavy gauge sheet metal, as is the packer plate. It is well known that such sheet metal parts are difficult to manufacture to extremely close tolerances. The lower edge of the packer plate must be positioned to sweep close to an upwardly curved bottom wall portion of the truck body adjacent its rear open end and the sides of the packer plate should fit closely between the vertical side walls of the body. It sometimes happens that contact or binding between the packer plate and the adjacent walls of the truck body occur in the customary arrangement where the pivot shaft of the packer plate is fixedly mounted with respect to the side walls of the body. The present invention in particular overcomes this condition of interference or binding between the packer plate and body through the provision of pillow blocks for the support of the packer plate shaft which may be independently adjusted at the time of installation on the truck body and securely locked against subsequent movement. This enables the packer plate to be adjusted initially to a proper clearance with respect to the walls of the truck body and to maintain such clearance during a long period of operation.

Other features and advantages of the invention will become apparent during the course of the following detailed description.

BRIEF DESCRIPTION OF DRAWING FIGURES

FIG. 1 is a side elevation of a refuse truck body having a packer plate equipped with the adjustable mounting means of the present invention.

FIG. 2 is an enlarged fragmentary side elevation of one adjustable pillow block and associated parts.

FIG. 3 is a enlarged fragmentary vertical section taken on line 3—3 of FIG. 2.

FIG. 4 is a further enlarged fragmentary vertical section taken on line 4—4 of FIG. 3.

FIG. 5 is a fragmentary rear elevational view of the truck body on a greatly reduced scale.

DETAILED DESCRIPTION

Referring to the drawings in detail wherein like numerals designate like parts throughout, the numeral 10 designates a refuse truck body having vertical side walls 11, a closed top wall 12, front wall 13 and a floor or bottom wall 14. The body 10 is fabricated from sheet metal. A short downwardly sloping rear wall portion 15 extends below the top wall 12 and terminates at a pair of horizontal ledges 16 formed at the tops of rear side wall extensions 17. Adjacent to these wall extensions 17, the floor of the truck body is curved upwardly on a circular arc at 18. The rear of the body is open below the wall portion 15 and between the extensions 17 and ledges 16. The entire body 10 is pivoted at 19 for dumping to upward extensions 20 of the truck main frame 21. An expansible and retractable dumping cylinder 22 is interconnected between the body 10 and main frame 21 well forwardly of the pivot 19, whereby the body 10 may be raised to a near vertical position for dumping, generally as shown in U.S. Pat. No. 3,554,398.

A packer door or plate 23 for the rearward opening of the body 10 is provided and is of rectangular form to fit closely between the wall extensions 17. The packer plate 23 is formed of sheet metal, suitably reinforced, and is subject to the same dimensional variations as the fabricated sheet metal body 10. The packer plate 23 embodies a transverse pivot shaft 24 suitably rigidly secured thereto and the opposite ends of this shaft extend over the tops of the ledges 16 which are horizontal. The ends of the shaft are received within and supported by sturdy pillow blocks 25 whose bases rest on mounting plates 26 having elongated slots 27 which receive clamping bolts 28 engaging through openings formed in the bases of the pillow blocks. The mounting plates 26 have spaced dependent legs 29 in the form of vertical plates welded thereto, FIGS. 2 and 3, to produce a table-like support for each pillow block 25. Each support composed of the elements 26 and 29 may be initially adjusted as required in a recessed portion of the ledge 16 indicated by the clearance space 30. The legs 29 engage vertical and horizontal wall portions 31 and 32 formed in the wall portions 17, as best shown in FIG. 3. After each table support has been properly adjusted upon the truck body, the legs 29 may be welded into place and attached permanently to the wall portions 31 and 32, as shown.

An additional adjustment for the pillow blocks 25 is provided at the slots 27, whereby the pillow blocks can be placed in exactly the required positions on the ledges 16 before being locked by the bolts 28 which carry nuts 33.

To facilitate the fine adjustment of the pillow blocks 25, opposed horizontal adjusting screws 34 are provided at the ends of the bases of the pillow blocks as shown in FIGS. 2 and 4. These adjusting screws have threaded engagement with fixed upstanding lugs 35 on each ledge 16 near the ends of the clearance space 30 or recess in each ledge. The adjusting screws are locked securely by lock nuts 36. There is a double lock on each pillow block 25 through the medium of the adjusting screws plus the locking effect of the bolts 28 on each pillow block. The arrangement allows for independent accurate adjustment of each pillow block 25 on an underlying ledge 16. Consequently, the packer plate 23 may be adjusted for a proper fit between the wall portions 17 and the curved floor portion 18 which must clear the swinging edge of the packer plate as it travels in an arc around the axis of the shaft 24. By means of the invention, therefore, it is possible to establish a minimum clearance between the packer plate and the curved floor portion 18 without having the packer plate bind or drag. Unavoidable dimensional variations in the sheet metal truck body and packer plate are thus compensated for by the invention in a simplified and practical manner and with economy.

The packer plate 23 is operated in an arc by conventional power cylinder means 37 preferably on each side of the truck body 10, such means having a connection at 38 with crank arms 39 on the rocker shaft 24 of the packer plate. As can be observed in FIG. 1, when the cylinder unit 37 is fully retracted and the packer plate 23 fully raised, there is always maintained somewhat less than a dead center condition betweeen the shaft 24, connection 28 and a base connection 40 where the cylinder units are anchored to the body 10. The fluid controls for the cylinders 37 and 22 are conventional and need not be illustrated. The use of the packer plate 23 for compacting refuse in the body 10 is well known and is described in U.S. Pat. No. 3,554,398.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a refuse dump truck, a refuse collection and dumping body having a rearward opening bounded by vertical side walls and an arcuate bottom wall, the side walls terminating at their tops in horizontal ledges, a vertically swingable packer plate adapted to enter between said side walls and to pass in closely spaced relation to said arcuate bottom wall, a pivot shaft for the support of the packer plate, a pair of pillow blocks receiving and supporting opposite ends of the pivot shaft for free rotation, power means connected with the packer plate to swing it on the axis of the pivot shaft, means mounting the pillow blocks on said ledges whereby the pillow blocks are independently bodily adjustable with the pivot shaft forwardly and rearwardly with respect to the truck body, said dumping body and said packer plate being fabricated from sheet metal and therefore subject to dimensional variations, said ledges being recessed below and adjacent to the ends of said pivot shaft, table-like independent supports for said pillow blocks seated within the sledge recesses and adapted to be welded therein after preliminary adjustment, bolts securing the bases of the pillow blocks to said table-like supports, and additional adjustable means engageable with opposite sides of the pillow blocks to facilitate adjusting them laterally and locking them in selected adjusted positions.

2. In a refuse dump truck, a refuse collection and dumping body having a rearward opening bounded by vertical side walls and an arcuate bottom wall, the side walls terminating at their tops in horizontal ledges, a vertically swingable packer plate adapted to enter between said side walls and to pass in closely spaced relation to said arcuate bottom wall, a pivot shaft for the support of the packer plate, a pair of pillow blocks receiving and supporting opposite ends of the pivot shaft for free rotation, power means connected with the packer plate to swing it on the axis of the pivot shaft, means mounting the pillow blocks on said ledges whereby the pillow blocks are independently bodily adjustable with the pivot shaft forwardly and rearwardly with respect to the truck body, said means comprising a mounting plate underlying each pillow block and having legs, each mounting plate having slots formed therethrough, clamping bolts engaging through said slots and through openings in the base of each pillow block and serving to secure each pillow block adjustably to the mounting plate beneath it, and additional means mounted on each ledge near the opposite sides of each pillow block to facilitate adjusting each pillow block laterally of the axis of said shaft and for positively locking each pillow block after adjustment.

3. The structure of claim 2, and said additional means mounted on each ledge comprising a pair of opposed horizontal adjusting screws adapted to about the opposite ends of the base of each pillow block, screw-threaded lugs fixed to each ledge being engaged by said screws, and locking nuts on said adjusting screws engageable with said lugs, whereby each pillow block is positively locked after adjustment against lateral movement in either direction by the combined action of said screws and clamping bolts.

4. The structure of claim 2, and said power means comprising at least one crank arm on said pivot shaft, and an extensible and retractable fluid pressure operated cylinder unit interconnecting the crank arm and said body and arranged to maintain an off-dead-center relationship between the axis of the pivot shaft and the connections of the crank arm and said body with said cylinder unit in all operative positions of the latter.

5. The structure of claim 2, and said dumping body and said packer plate being fabricated from sheet metal and therefore subject to dimensional variations, said ledges being recessed below and adjacent to the ends of said pivot shaft, table-like independent supports for said pillow blocks seated within the ledge recesses and adapted to be welded therein after preliminary adjustment, bolts securing the bases of the pillow blocks to said table-like supports, and additional adjustable means engageable with opposite sides of the pillow blocks to facilitate adjusting them laterally and locking them in selected adjusted positions.

6. The structure of claim 5, and said table-like independent supports comprising horizontal mounting plates directly underlying the bases of the pillow blocks and being slotted to receive said bolts adjustably, whereby the pillow blocks may be shifted laterally upon the mounting plates.

7. The structure of claim 6, and said additional adjustable means comprising a pair of opposed horizontal adjusting set screws having locking nuts.

* * * * *